(12) United States Patent
Watariuchi

(10) Patent No.: US 11,630,622 B2
(45) Date of Patent: Apr. 18, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Satoki Watariuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/528,014

(22) Filed: Nov. 16, 2021

(65) Prior Publication Data
US 2022/0164148 A1 May 26, 2022

(30) Foreign Application Priority Data
Nov. 20, 2020 (JP) .............................. JP2020-193237

(51) Int. Cl.
*G06F 3/12* (2006.01)
(52) U.S. Cl.
CPC .......... *G06F 3/1253* (2013.01); *G06F 3/1208* (2013.01); *G06F 3/1241* (2013.01); *G06F 3/1273* (2013.01)
(58) Field of Classification Search
CPC .... G06F 3/1253; G06F 3/1208; G06F 3/1241; G06F 3/1273; G06F 3/1205; G06F 3/048
See application file for complete search history.

(56) References Cited

U.S. PATENT DOCUMENTS

| | | | | |
|---|---|---|---|---|
| 2017/0061521 | A1* | 3/2017 | Lee | ........................ F25D 29/00 |
| 2020/0389691 | A1* | 12/2020 | Yoshizawa | ......... H04N 21/4223 |
| 2021/0182084 | A1* | 6/2021 | Fariss | .................. H04M 3/5116 |
| 2022/0083299 | A1* | 3/2022 | Sakai | .................... G06F 3/1204 |

FOREIGN PATENT DOCUMENTS

JP 2014238700 A 12/2014

* cited by examiner

*Primary Examiner* — Iriana Cruz
(74) *Attorney, Agent, or Firm* — Canon U.S.A., Inc. IP Division

(57) ABSTRACT

An information processing apparatus includes at least one processor and at least one memory coupled to the at least one processor and storing instructions, which when executed by the at least one processor, cause the at least one processor and the at least one memory to act as a display unit configured to display, on a plurality of pages of an operation screen, a plurality of display objects for giving instructions to perform processing, and an acquisition unit configured to acquire use histories of the plurality of display objects. A number of display objects to be displayed on a single page of the operation screen among the plurality of display objects is determined based on at least the acquired use histories.

19 Claims, 16 Drawing Sheets

FIG.5

| BUTTON ID | BUTTON NAME | CALLING APP | SETTING VALUES |
|---|---|---|---|
| b001 | B&W TWO-SIDED COPY | COPY APP 410 | 1copies, bw, two-sided |
| b002 | SEND TO FOLDER A | SENDING APP 412 | color, two-sided, 300dpi, to:\\server1\folderA\ |
| b003 | PRINT | PRINT APP 411 | ... |
| b004 | COPY | COPY APP 410 | ... |
| b005 | FAX | FAX APP 413 | ... |
| b006 | SCAN AND SEND | SENDING APP 412 | ... |
| b007 | WEB BROWSER | WEB BROWSER 414 | ... |
| b008 | ADDRESS BOOK | ADDRESS BOOK APP 415 | ... |

| USER ID | NUMBER OF DISPLAY BUTTONS | BUTTON DISPLAY ORDER |
|---|---|---|
| u001 | 4 | b001, b002, b004, b003, b005, b006, b007, b008 |
| u002 | 3 | b001, b002, b008, b007, b005, b006, b003, b004 |
| u003 | 6 | b005, b006, b007, b001, b002, b003, b004, b008 |
| u004 | 8 | b008, b001, b002, b004, b003, b005, b006, b007 |
| ... | ... | ... |

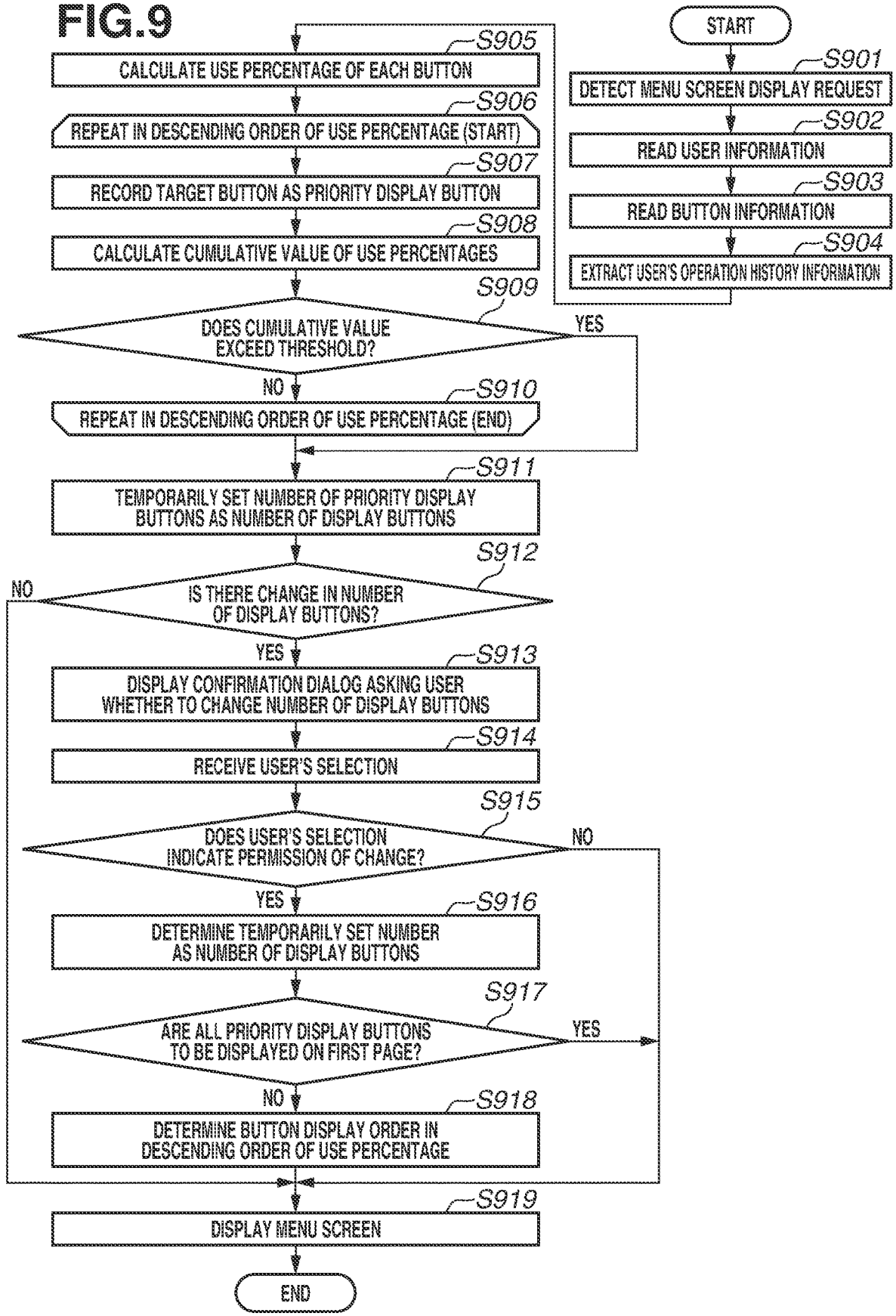

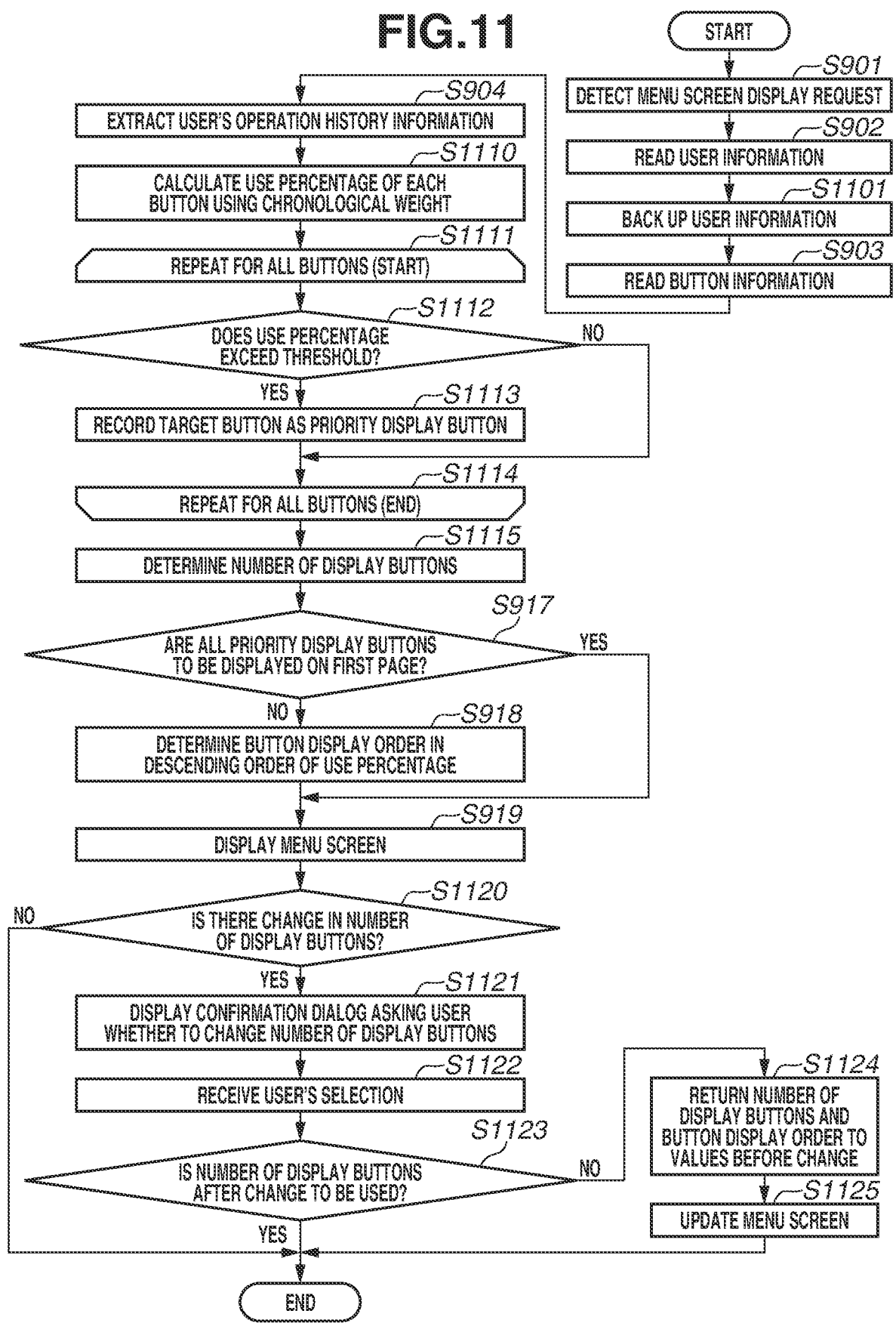

FIG.12

| 501 | 502 | 503 | 504 |
|---|---|---|---|
| BUTTON ID | BUTTON NAME | CALLING APP | SETTING VALUES |
| b001 | B&W TWO-SIDED COPY | COPY APP 410 | 1copies, bw, two-sided |
| b002 | SEND TO FOLDER A | SENDING APP 412 | color, two-sided, 300dpi, to:\\server1\folderA\ |
| b003 | PRINT | PRINT APP 411 | ... |
| b004 | COPY | COPY APP 410 | ... |
| b005 | FAX | FAX APP 413 | ... |
| b006 | SCAN AND SEND | SENDING APP 412 | ... |
| b007 | WEB BROWSER | WEB BROWSER 414 | ... |
| b008 | ADDRESS BOOK | ADDRESS BOOK APP 415 | ... |
| b009 | COLOR TWO-SIDED COPY | COPY APP 410 | 3copies, color, two-sided |
| b010 | SEND TO FOLDER C | SENDING APP 412 | bw, one-sided, 300dpi, to:\\server1\folderC\ |

FIG.13

| | OPERATION DATE AND TIME | USER ID | OPERATED BUTTON ID | CALLING APP | SETTING VALUES |
|---|---|---|---|---|---|
| | *601* | *602* | *603* | *1301* | *1302* |
| *1311* | 2020/6/20 9:14:15 | u001 | b001 | COPY APP 410 | 1copies, bw, two-sided |
| *1312* | 2020/6/20 10:21:13 | u001 | b002 | SENDING APP 412 | color, two-sided, 300dpi, to:\\server1\folderA\ |
| *1313* | 2020/6/20 11:11:08 | u002 | b004 | COPY APP 410 | 3copies, color, two-sided |
| *1314* | 2020/6/20 14:08:43 | u003 | b004 | COPY APP 410 | 10copies, color, one-sided |
| *1315* | 2020/6/21 10:02:17 | u002 | b006 | SENDING APP 412 | bw, one-sided, 300dpi, to:\\server1\folderC\ |
| *1316* | 2020/6/21 13:32:54 | u002 | b004 | COPY APP 410 | 3copies, color, two-sided |
| *1317* | 2020/6/21 15:23:51 | u001 | b006 | SENDING APP 412 | color, one-sided, 300dpi, to:\\server1\folderB\ |
| *1318* | 2020/6/21 18:36:36 | u002 | b006 | SENDING APP 412 | bw, one-sided, 300dpi, to:\\server1\folderC\ |
| | ... | ... | ... | ... | ... |

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a storage medium.

Description of the Related Art

There are many information processing apparatuses including a menu screen. In recent years, an image forming apparatus (a multi-function printer (MFP)), which is a type of information processing apparatus, has generally been provided with a menu screen. The menu screen is used to allow a user to select which of a plurality of applications (hereinafter referred to as "apps") installed on the MFP is to be called. Typically, buttons are used as components representing the apps on the menu screen.

If all the buttons cannot be displayed in a single page of the menu screen, the display of the buttons is divided into a plurality of pages. By advancing the pages, the user can switch the buttons displayed on the menu screen. Japanese Patent Application Laid-Open No. 2014-238700 discusses a technique enabling the user to set the number of buttons to be displayed on the menu screen (hereinafter referred to as "the number of display buttons"). By making a setting such as changing the number of display buttons or arranging frequently used buttons on the first page, the user can customize the menu screen for ease of use.

However, according to the conventional technique, to customize the menu screen, the user or an administrator needs to make settings. More specifically, to make the optimal settings, the user or the administrator needs to identify the buttons frequently used by the user and then customize the number of display buttons and the arrangement order of the buttons so as to display all the frequently used buttons on the first page, which is troublesome. For this reason there may be a case where the default setting of the number of display buttons is simply used. However, if the number of display buttons displayed on a single page of the menu screen is large, visibility for a user who uses only a limited number of buttons can decrease. If the number of display buttons displayed on the first page is small, a user who frequently uses multiple buttons always needs to advance the pages to operate the buttons, which is not user-friendly.

SUMMARY

Embodiments of the present disclosure are directed to optimizing the number of buttons to be displayed on an operation screen, thereby improving convenience for a user in operating the operation screen.

According to embodiments of the present disclosure, an information processing apparatus includes at least one processor and at least one memory coupled to the at least one processor and storing instructions, which when executed by the at least one processor, cause the at least one processor and the at least one memory to act as a display unit configured to display, on a plurality of pages of an operation screen, a plurality of display objects for giving instructions to perform processing, and an acquisition unit configured to acquire use histories of the plurality of display objects. A number of display objects to be displayed on a single page of the operation screen among the plurality of display objects is determined based on at least the acquired use histories.

Further features of the present disclosure will become apparent from the following description of exemplary embodiments with reference to the attached drawings.

BRIEF DESCRIPTION OF THE DRAWINGS

FIG. 5 is a diagram illustrating an example of a button management table according to the first exemplary embodiment.

FIG. 7 is a diagram illustrating an example of a user management table according to the first exemplary embodiment.

FIG. 9 is a flowchart illustrating menu screen display processing according to the first exemplary embodiment.

FIG. 11 is a flowchart illustrating menu screen display processing according to a second exemplary embodiment.

FIG. 12 is a diagram illustrating an example of a button management table according to a third exemplary embodiment.

FIG. 13 is a diagram illustrating an example of an operation history table according to the third exemplary embodiment.

DESCRIPTION OF THE EMBODIMENTS

Figure 1:
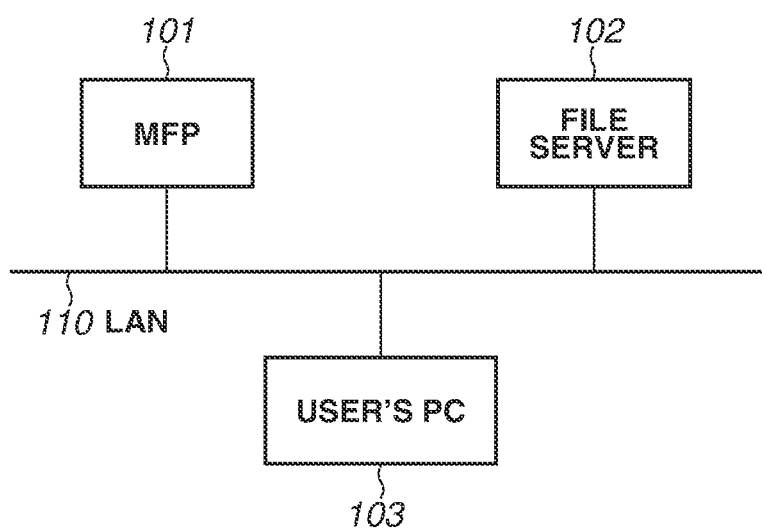
FIG. 1 is a diagram illustrating an example of an overall configuration of an information processing system according to a first exemplary embodiment.

Exemplary embodiments of the present disclosure will be described below with reference to the attached drawings, FIG. 1 illustrates an overall configuration of an information processing system according to a first exemplary embodiment of the present disclosure. The information processing system includes a multi-function printer (MFP) 101, a file server 102, and a user's personal computer (PC)

103. The MFP 101, the file server 102, and the user's PC 103 can communicate with each other via a local area network (LAN) 110. These apparatuses may be configured to communicate with each other via a wide area network (WAN). While the information processing system illustrated in FIG. 1 includes the single MFP 101, the single file server 102, and the single user's PC 103, the information processing system according to the present exemplary embodiment may include a plurality of the MFPs 101, a plurality of the file servers 102, and a plurality of the user's PCs 103. While in the present exemplary embodiment, the MFP 101 is described as an example of an information processing apparatus, any other information processing apparatus may be used as long as the information processing apparatus is configured to display an operation screen.

The MFP 101 is an image forming apparatus including a scanner and a printer. The file server 102 includes a network folder that the MFP 101 and the user's PC 103 can refer to, and can be a transmission destination of image data scanned by the MFP 101. The user's PC 103 is used by a user to perform tasks. The user's PC 103 can transmit print data to the MFP 101 by using a printer driver in response to a user's operation. While the following description is given on the assumption that the single MFP 101 performs processing in flowcharts to be described below, a configuration may be employed in which a plurality of apparatuses connected together via the LAN 110 shares the processing in the flowcharts.

Figure 2:
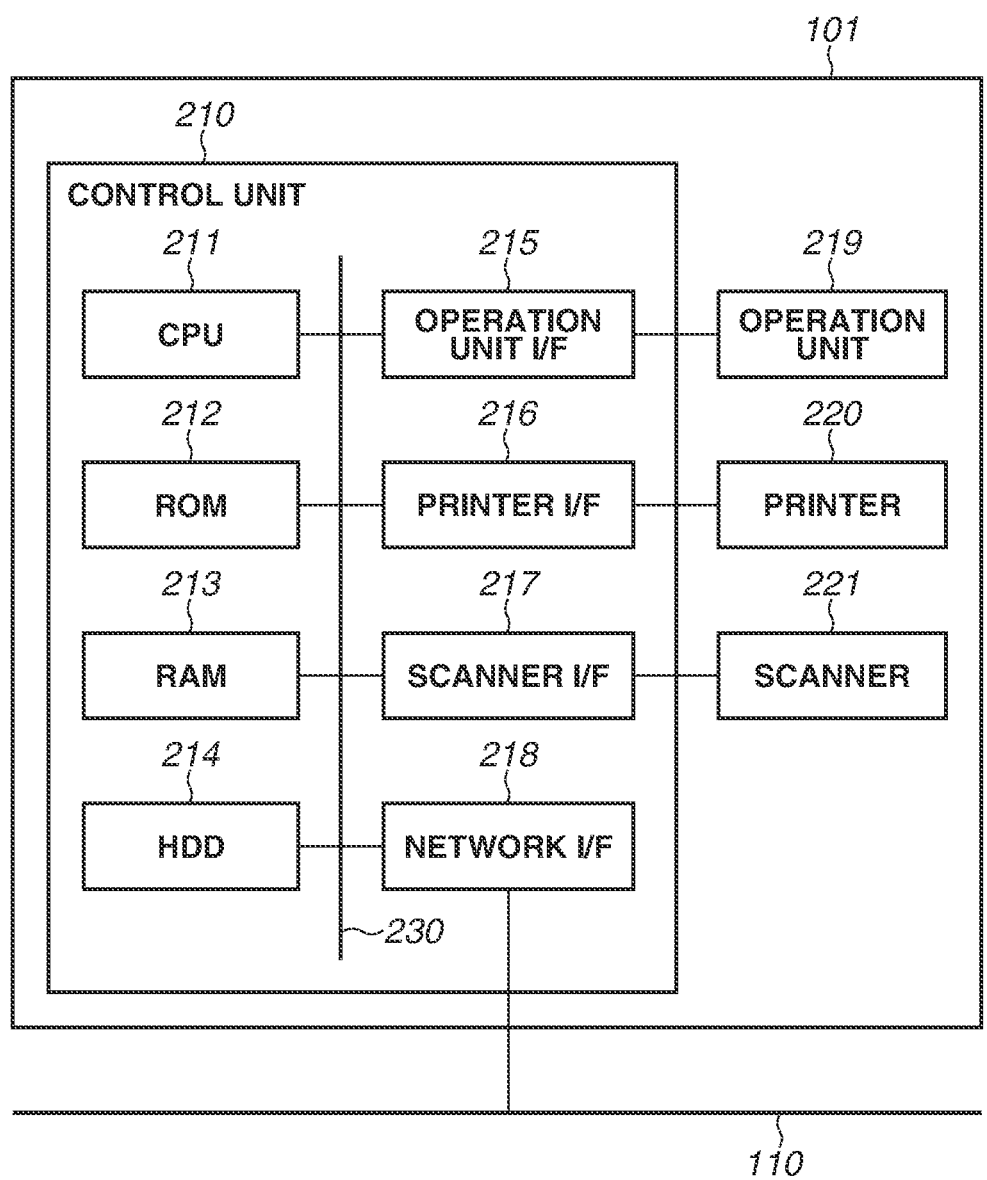
FIG. 2 is a diagram illustrating an example of a hardware configuration of a multi-function printer (MFP) according to the first exemplary embodiment.

FIG. 2 is a block diagram illustrating a hardware configuration of the MFP 101. A control unit 210 including a central processing unit (CPU) 211 controls the entire operation of the MFP 101. The CPU 211 reads and executes a program stored in a read-only memory (ROM) 212 or a hard disk drive (HDD) 214, thereby performing various types of control processing such as reading control and transmission control. The CPU 211 controls a display content displayed on an operation unit 219 and also performs processing according to an instruction input by the user through the operation unit 219. A random-access memory (RAM) 213 is used as a temporary storage area such as a main memory or a work area of the CPU 211. The HDD 214 stores image data, various programs executable by the CPU 211, and various data tables to be described below. The control unit 210 includes, as various interfaces (I/Fs), an operation unit I/F 215, a printer I/F 216, a scanner I/F 217, and a network I/F 218. The CPU 211, the ROM 212, the RAM 213, the HDD 214, and the various I/Fs 215 to 218 are connected together via a bus 230.

The operation unit I/F 215 connects the operation unit 219 and the control unit 210. The operation unit 219 includes a liquid crystal display unit having a touch panel function, and a key board. The operation unit 219 displays a menu screen under control of the CPU 211 and inputs an instruction issued by a user's operation on the menu screen, to the control unit 210 via the operation unit I/F 215. The printer I/F 216 connects a printer 220 and the control unit 210. Image data to be printed by the printer 220 is transferred from the control unit 210 to the printer 220 via the printer I/F 216 and then printed on a recording medium by the printer 220. The scanner I/F 217 connects a scanner 221 and the control unit 210. The scanner 221 reads stacked document sheets to generate image data. The scanner 221 then inputs the image data to the control unit 210 via the scanner I/F 217. The network I/F 218 connects the control unit 210 to the LAN 110. The control unit 210 transmits and receives various pieces of information to and from another apparatus on the LAN 110 via the network I/F 218.

A functional configuration of the MFP 101 (described below) is implemented by the CPU 211 loading a program stored in the ROM 212 or the HDD 214 into the RAM 213 and executing the program. The processing in the flowcharts (described below) is implemented by the CPU 211 loading a program stored in the ROM 212 or the HDD 214 into the RAM 213 and executing the program.

Figure 3:
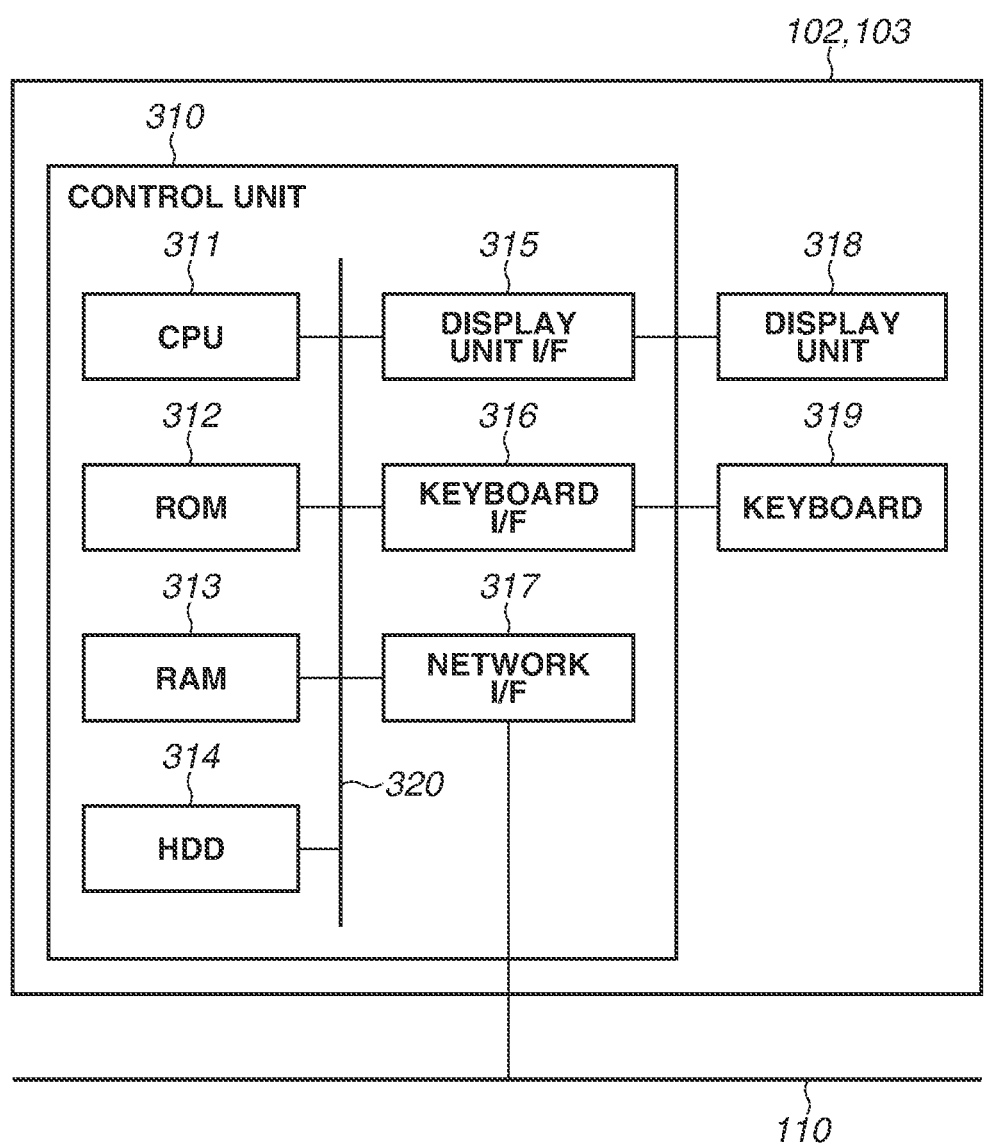
FIG. 3 is a diagram illustrating an example of a hardware configuration of each of a file server and a user's personal computer (PC) according to the first exemplary embodiment.

FIG. 3 is a block diagram illustrating a hardware configuration of each of the file server 102 and the user's PC 103. A control unit 310 including a CPU 311 controls the entire operation of the apparatus. The CPU 311 reads a control program stored in a ROM 312 or an HDD 314 and performs various types of control processing. A RAM 313 is used as a temporary storage area such as a main memory or a work area of the CPU 311, The HDD 314 stores various programs and data. The control unit 310 includes, as various I/Fs, a display unit I/F 315, a keyboard I/F 316, and a network I/F 317. The CPU 311 is connected to the ROM 312, the RAM 313, the HDD 314, and the various I/Fs 315 to 317 via a bus 320.

The display unit I/F 315 connects a display unit 318 and the control unit 310. The keyboard I/F 316 connects a keyboard 319 and the control unit 310. The CPU 311 recognizes an instruction from a user through the keyboard 319 and causes a screen displayed on the display unit 318 to transition according to the recognized instruction. The network I/F 317 connects the control unit 310 to the LAN 110. The control unit 310 transmits and receives various pieces of information to and from another apparatus on the LAN 110 via the network I/F 317.

Figure 4:
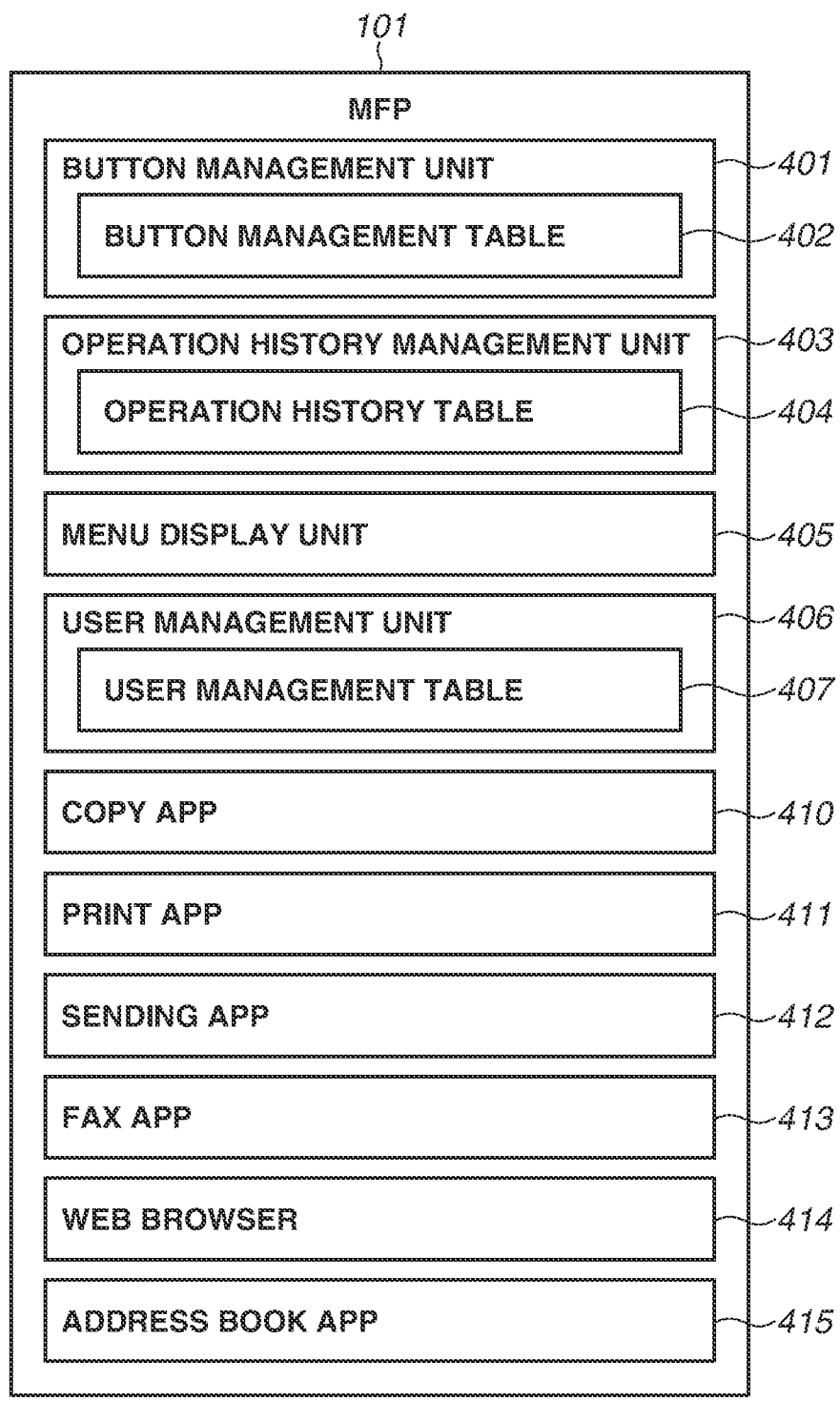
FIG. 4 is a diagram illustrating an example of a functional configuration of the MFP according to the first exemplary embodiment.

FIG. 4 is a block diagram illustrating the functional configuration of the MFP 101. The functions of a button management unit 401, an operation history management unit 403, a menu display unit 405, and a user management unit 406 are implemented by the CPU 211 loading a program stored in the ROM 212 or the HDD 214 into the RAM 213 and analyzing and executing the program.

The button management unit 401 manages information about display objects, such as buttons or keys, to be displayed on the menu screen of the MFP 101. The buttons are examples of components for giving instructions to call applications of the MFP 101. A button management table 402 is a data table that holds information about the buttons to be displayed on the menu screen of the MFP 101, and is recorded in the RAM 213 or the HDD 214.

The operation history management unit 403 manages operation history information about operations on the menu screen of the MFP 101. An operation history table 404 is a data table that holds operation history information about operations on the menu screen of the MFP 101, and is recorded in the RAM 213 or the HDD 214.

The menu display unit 405 displays, on the menu screen, the buttons about which the information is held in the button management table 402. The menu screen is an example of the operation screen.

The user management unit 406 manages users of the MFP 101. A user management table 407 is a data table that holds information about the users of the MFP 101 (e.g., setting values for each user), and is recorded in the RAM 213 or the HDD 214.

Functions of various applications are implemented by the CPU 211 loading programs of the various applications stored in the ROM 212 or the HDD 214 into the RAM 213 and analyzing and executing the programs. Hereinafter, an "application" will be referred to as an "app". In the present exemplary embodiment, the MFP 101 has the functions of a copy app 410, a print app 411, a sending app 412, a facsimile (fax) app 413, a web browser 414, and an address book app 415.

The copy app 410 provides a copy function. The print app 411 provides a hold print function. The print app 411 temporarily saves the print data received from the user's PC 103 in the HDD 214, and performs printing in response to a separate instruction from the user. The sending app 412 provides a function of transmitting scanned image data. The sending app 412 can specify the network folder in the file server 102 as a transmission destination of the image data. The fax app 413 provides a fax function. The web browser 414 accesses a web server (not illustrated) on the LAN 110 via the network I/F 218 and displays on the operation unit 219 a web page provided by the web server. The address book app 415 manages addresses that are transmission destinations of the sending app 412. The copy app 410, the print app 411, the sending app 412, the fax app 413, the web browser 414, and the address book app 415 are examples of the apps installed on the MFP 101, and the number of apps may be increased or decreased.

FIG. 5 illustrates an example of the button management table 402 according to the present exemplary embodiment. In the example of FIG. 5, a single row (a single record) represents button information defining a single button, and eight pieces of button information from button information 511 to button information 518 are held. Each button information includes information such as button identification (ID) 501, a button name 502, a calling app 503, and setting values 504. The button ID 501 is an identifier for uniquely identifying a button. The button name 502 is a name to be displayed on the button on the menu screen and indicates the content of a job to be executed by a called app. As the calling app 503, an app to be called when the button is selected by a user is set. As the setting values 504, setting values to be assigned as parameters to the called app are set. The called app to which specific parameters are assigned performs processing, such as displaying a setting screen for the app or performing a function (a job) included in the app, according to the assigned parameters.

Regarding the button defined by the button information 511, the button ID 501 is "b001", the button name 502 is "black and white (b&w) two-sided copy", the calling app 503 is "copy app 410", and the setting values 504 are set.

Regarding the button defined by the button information 512, the button ID 501 is "b002", the button name 502 is "send to folder A", the calling app 503 is "sending app 412", and the setting values 504 are set.

Regarding the button defined by the button information 513, the button ID 501 is "b003", the button name 502 is "print", the calling app 503 is "print app 411", and the setting values 504 are not set.

Regarding the button defined by the button information 514, the button ID 501 is "b004", the button name 502 is "copy", the calling app 503 is "copy app 410", and the setting values 504 are not set.

Regarding the button defined by the button information 515, the button ID 501 is "b005", the button name 502 is "fax", the calling app 503 is "fax app 413", and the setting values 504 are not set.

Regarding the button defined by the button information 516, the button ID 501 is "b006", the button name 502 is "scan and send", the calling app 503 is "sending app 412", and the setting values 504 are not set.

Regarding the button defined by the button information 517, the button ID 501 is "b007", the button name 502 is "web browser", the calling app 503 is "web browser 414", and the setting values 504 are not set.

Regarding the button defined by the button information 518, the button ID 501 is "b008", the button name 502 is "address book", the calling app 503 is "address book app 415", and the setting values 504 are not set.

In the following description, a button defined by button information in which the setting values 504 are set or a button for which setting values changed from default setting values (e.g., factory setting values) are set will be referred to as a "custom button". In FIG. 5, the two buttons defined by the pieces of button information 511 and 512 are custom buttons. Based on an instruction from an administrator or a user of the MFP 101, the button management unit 401 can set a setting value for a custom button. On the other hand, a button defined by button information in which the setting values 504 are not set or a button associated with the default setting values is referred to as an "app button". In FIG. 5, the six buttons defined by the pieces of button information 513 to 518 are app buttons. If an app button is selected, an app is called based on initial settings. In the following description, the button ID 501 is used to identify a button. For example, the button defined by the button information 511 is described as the "b001 button".

Figure 6:
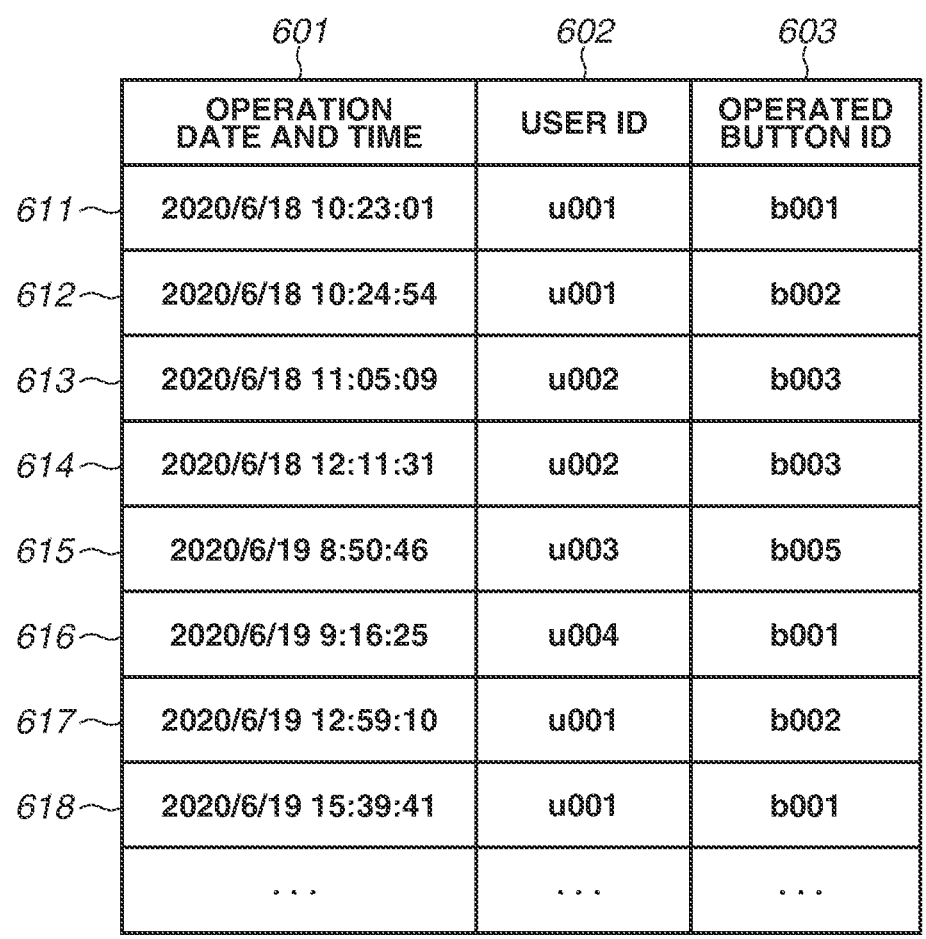
FIG. 6 is a diagram illustrating an example of an operation history table according to the first exemplary embodiment.

FIG. 6 illustrates an example of the operation history table 404 according to the present exemplary embodiment. In the example of FIG. 6, a single row (a single record) represents an operation history corresponding to a single operation, and eight operation histories from an operation history 611 to an operation history 618 are recorded, Each operation history includes information such as an operation date and time 601, user ID 602, and operated button ID 603. The operation date and time 601 is time information about the time when a user performs an operation. The user ID 602 indicates the user who performs the operation, and is associated with user ID 701 (see FIG. 7) in the user management table 407 to be described next. The operated button ID 603 indicates a button used by the user, and is associated with the button ID 501 in the button management table 402.

FIG. 7 illustrates an example of the user management table 407 according to the present exemplary embodiment. In the example of FIG. 7, a single row (a single record) represents user information defining a single user, and four pieces of user information from user information 711 to user information 714 are held. Each user information includes information such as the user ID 701, the number of display buttons 702, and button display order 703. The user ID 701 is an identifier for uniquely identifying a user. As the number of display buttons 702, the number of buttons to be displayed on a single page of the menu screen (hereinafter referred to as "the number of display buttons") is set. As the button display order 703, the order of the buttons to be displayed on the menu screen (hereinafter referred to as the "button display order") is set. In the following description, the user ID 701 is used to identify a user. For example, the user defined by the user information 711 is described as the "user u001".

Figure 8A:
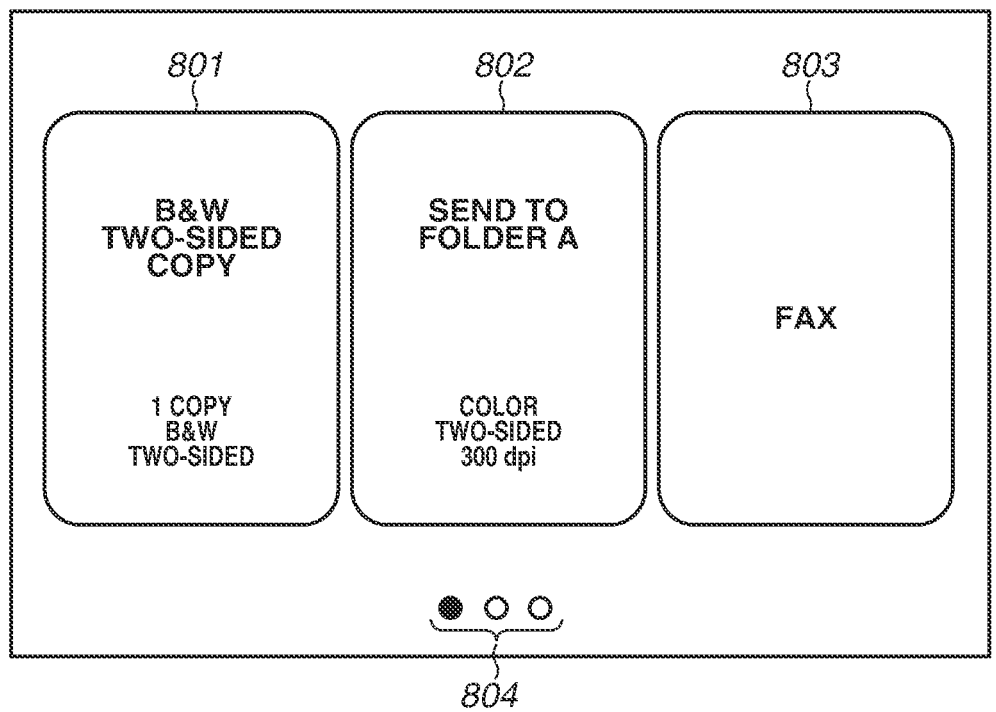
FIG. 8 is a diagram illustrating an example of a menu screen (where the number of display buttons is three) according to the first exemplary embodiment.
FIG. 8B is a diagram illustrating another example of the menu screen (where the number of display buttons is six) according to the first exemplary embodiment.
Figure 8B:
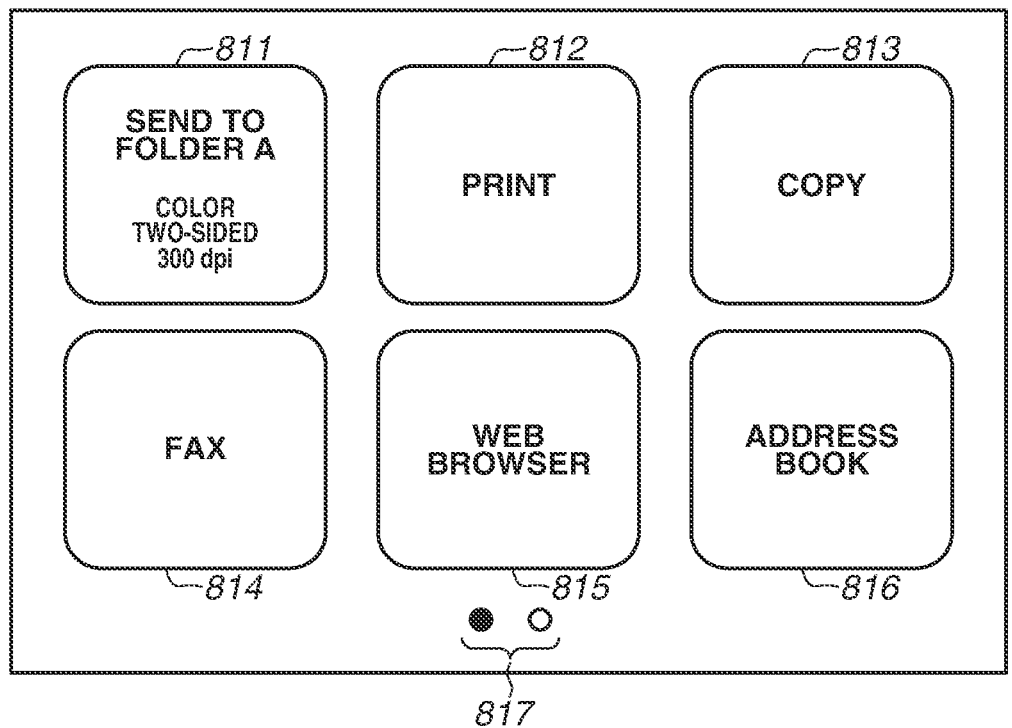

FIGS. 8A and 8B illustrate examples of the menu screen of the MFP 101 according to the present exemplary embodiment. The MFP 101 displays the menu screen on the operation unit 219 of the MFP 101. As illustrated in FIGS. 8A and 8B, as many buttons as the set number of display buttons are arranged on a single page of the menu screen.

In the example of FIG. 8A the number of display buttons is three. Three buttons 801 to 803 displayed on the menu screen of FIG. 8A are respectively associated with three of the pieces of button information held in the button management table 402. If any of the buttons 801 to 803 is pressed, the MFP 101 refers to the button management table 402 and calls the app corresponding to the pressed button. An indicator 804 indicates the total number of pages of the menu screen and the currently displayed page. The example of FIG. 8A indicates that the menu screen has three pages, and the first page is currently displayed. By flicking the screen to the left and right, the user can change the displayed page. As described above, in a case where the number of components as display targets exceeds the set number of display buttons, the MFP 101 displays the components as the display targets on a plurality of pages.

In the example of FIG. 8B, the number of display buttons is six. Six buttons 811 to 816 displayed on the menu screen of FIG. 8B are respectively associated with six of the pieces of button information held in the button management table 402. If any of the buttons 811 to 816 is pressed, the MFP 101 refers to the button management table 402 and calls the app corresponding to the pressed button. An indicator 817 is similar to the indicator 804 illustrated in FIG. 8A. The example of FIG. 8B indicates that the menu screen has two pages, and the first page is currently displayed.

As described above, based on the set number of display buttons, the MFP 101 changes the number of components to be displayed on a single page of the operation screen.

FIG. 9 is a flowchart illustrating menu screen display processing according to the present exemplary embodiment. The menu screen display processing is performed by the MFP 101 to display the menu screen on the operation unit 219. Steps illustrated in the flowchart of FIG. 9 are implemented by the CPU 211 loading a program stored in the ROM 212 or the HDD 214 of the MFP 101 into the RAM 213 and analyzing and executing the program.

In step S901, the menu display unit 405 receives a menu screen display request. The source of the menu screen display request may be a user's operation or a notification from the system. For example, if a user's operation has not been performed for a certain period of time, the menu display unit 405 is to display the menu screen.

Next, in step S902, the menu display unit 405 acquires user information about the user currently logged into the MFP 101 (hereinafter referred to as the "logged-in user") from the user management table 407 through the user management unit 406. In the present exemplary embodiment, the description is given on the assumption that the MFP 101 is used by the user logging into the MFP 101. However, the login to the MFP 101 may not necessarily be performed. In a case where the login to the MFP 101 is not performed, the processing is performed on the assumption that a single user uses the MFP 101, i.e., the same logged-in user always uses the MFP 101.

Next, in step S903, the menu display unit 405 acquires pieces of button information about the buttons to be displayed on the menu screen, from the button management table 402 through the button management unit 401. In the present exemplary embodiment, the button management table 402 is common to all users and thus the menu display unit 405 reads all the pieces of button information held in the button management table 402. Alternatively, the menu display unit 405 may display different buttons for different users. In this case, information about the user for which the button is set as the display target may be added to each of the pieces of button information held in the button management table 402. In the following description, the group of pieces of button information acquired in step S903 will be referred to as the "button list".

Next, in step S904, the menu display unit 405 acquires operation histories corresponding to the logged-in user from the operation history table 404 through the operation history management unit 403. More specifically, the menu display unit 405 extracts, from all the operation histories held in the operation history table 404, operation histories of which the user ID 602 matches the user ID of the logged-in user. At this time, the menu display unit 405 may extract only the operation histories satisfying a predetermined condition. For example, the menu display unit 405 may extract the operation histories recorded within a predetermined period (e.g., within the past one month), or may extract a predetermined number of the most recent operation histories (e.g., the most recent 100 operation histories).

Next, in step S905, the menu display unit 405 uses the operation histories acquired in step S904 to calculate the use percentage of each button. The use percentage of each button indicates the percentage of the number of tines of use of each button with respect to the total number of times of use of buttons. More specifically, the menu display unit 405 counts the number of operation histories for each button and divides the counted number by the total number of operation histories, thereby obtaining the use percentage of each button. The following description will be given using an example where the calculation results of the use percentages are 40% for the b001 button, 30% for the b002 button, 5% for the b003 button, 20% for the b004 button, 5% for the b005 button, and 0% for the other buttons.

The processing in steps S906 to S910 is repeated for each button included in the button list. In this processing, the menu display unit 405 rearranges the button list in descending order of the use percentages calculated in the step S905, and processes the buttons one by one starting from the first button in the button list. In the following description, a button as a processing target will be referred to as a "target button".

First, in step S907, the menu display unit 405 records the current target button as a button to be displayed on a priority basis on the menu screen (hereinafter referred to as a "priority display button") in the RAM 213. The priority display button means a component to be displayed on a priority basis on the first page of the operation screen. In other words, the MFP 101 determines high-priority components in descending order of the use percentages. Next, in step S908, the menu display unit 405 calculates a cumulative value of the use percentages of the processed target buttons, More specifically, the menu display unit 405 adds the use percentage of the current target button to the combined value of the use percentages of the target buttons processed up to the previous time. In other words, the MFP 101 adds the use percentage of each component in descending order. For example, in a case where the target button is the b004 button, the buttons for which the cumulative value is calculated are the b001 button (with a use percentage of 40%), the b002 button (with a use percentage of 30%), and the b004 button (with a use percentage of 20%). Thus, the cumulative value of the use percentages is 90%.

Next, in step S909, the menu display unit 405 determines whether the cumulative value of the use percentages calculated in step S908 exceeds a threshold (a first threshold). If the menu display unit 405 determines that the cumulative value of the use percentages exceeds the threshold (YES in step S909), the repetitive processing ends, and the processing proceeds to step S911. If not (NO in step S909), the processing proceeds to step S910. The threshold may be a fixed value, or may be any value that can be set. It is assumed here that the threshold is 80%. For example, in a case where the target button is the b002 button, the cumulative value of the use percentages is 70% and is thus determined as not exceeding a the threshold. Subsequently, the processing is performed on the next button (the b004 button) in the button list as the target button. At this time, the cumulative value of the use percentages is 90% and is thus determined as exceeding the threshold.

In step S910, the menu display unit 405 determines whether to end the repetitive processing. If the processing on all the buttons in the button list is completed, the menu display unit 405 ends the repetitive processing, and the processing proceeds to step S911. If the button list includes a button that has not yet been processed, the processing proceeds to step S906. In step S906, the menu display unit 405 sets the next button in the button list as the target button and continues the repetitive processing.

In step S911, the menu display unit 405 temporarily sets the number of buttons recorded as the priority display buttons in step S907, as the number of display buttons. More specifically, if the cumulative value obtained by adding the respective use percentages of the components in descending order exceeds the threshold, the MFP 101 holds, as the number of display buttons, the number of components of which the use percentages are added. In this step, the number of display buttons is temporarily set and has not yet been determined as the number of buttons to be actually displayed on the menu screen.

In step S912, the menu display unit 405 determines whether the temporarily set number of display buttons is different from the number of display buttons 702 set for the logged-in user that is acquired in step S902. If the menu display unit 405 determines that the numbers of display buttons are different from each other (YES in step S912), the processing proceeds to step S913. If not (NO in step S912), the processing proceeds to step S919.

In step S913, the menu display unit 405 displays on the operation unit 219 a confirmation dialog (not illustrated) asking the user whether to permit the change in the number of display buttons. Then, in step S914, the menu display unit 405 receives a selection from the user via the confirmation dialog.

In step S915, the menu display unit 405 determines whether the selection received in step S914 indicates the permission of the change in the number of display buttons. If the menu display unit 405 determines that the change in the number of display buttons is permitted (YES in step S915), the processing proceeds to step S916. If the menu display unit 405 determines that the change in the number of display buttons is not permitted (NO in step S915), the processing proceeds to step S919 without changing the number of display buttons.

In step S916, the menu display unit 405 determines the value temporarily set in step S911 as the number of display buttons, and updates the number of display buttons 702 set for the logged-in user to the determined value through the user management unit 406. As described above, the MFP 101 asks the user whether to permit the change in the number of display buttons. Then if the selection received from the user indicates the permission of the change in the number of display buttons, the MFP 101 changes the number of display buttons.

In step S917, the menu display unit 405 determines whether all the priority display buttons are to be displayed on the first page of the menu screen. More specifically, the menu display unit 405 extracts as many buttons as the value of the number of display buttons 702, starting from the first button in the arrangement order of the buttons that is set as the button display order 703 for the logged-in user, and determines whether the extracted buttons include all the priority display buttons. If the menu display unit 405 determines that all the priority display buttons are to be displayed on the first page (YES in step S917), the processing proceeds to step S919. If not (NO in step S917), the processing proceeds to step S918.

In step S918, the menu display unit 405 determines, as the arrangement order of the buttons to be displayed on the menu screen, the arrangement order of the button list obtained by rearranging the buttons in descending order of the use percentages, and updates the button display order 703 for the logged-in user to the determined arrangement order through the user management unit 406. In other words, the MFP 101 changes the display order of the components so that all the high-priority components are displayed on the first page of the menu screen.

In step S919, the menu display unit 405 sets the number of buttons to be displayed on a single page to the value of the number of display buttons 702 in the user management table 407, and displays the menu screen so that the buttons are arranged in the button display order 703. At this time, the menu display unit 405 adjusts the sizes and positions of the buttons to be displayed on the menu screen based on the value of the number of display buttons 702. The menu display unit 405 calculates the total number of pages based on the values of the number of buttons included in the button display order 703 and the number of display buttons 702, and displays the buttons on a plurality of pages. Then, the series of processing in FIG. 9 ends.

Figure 10:
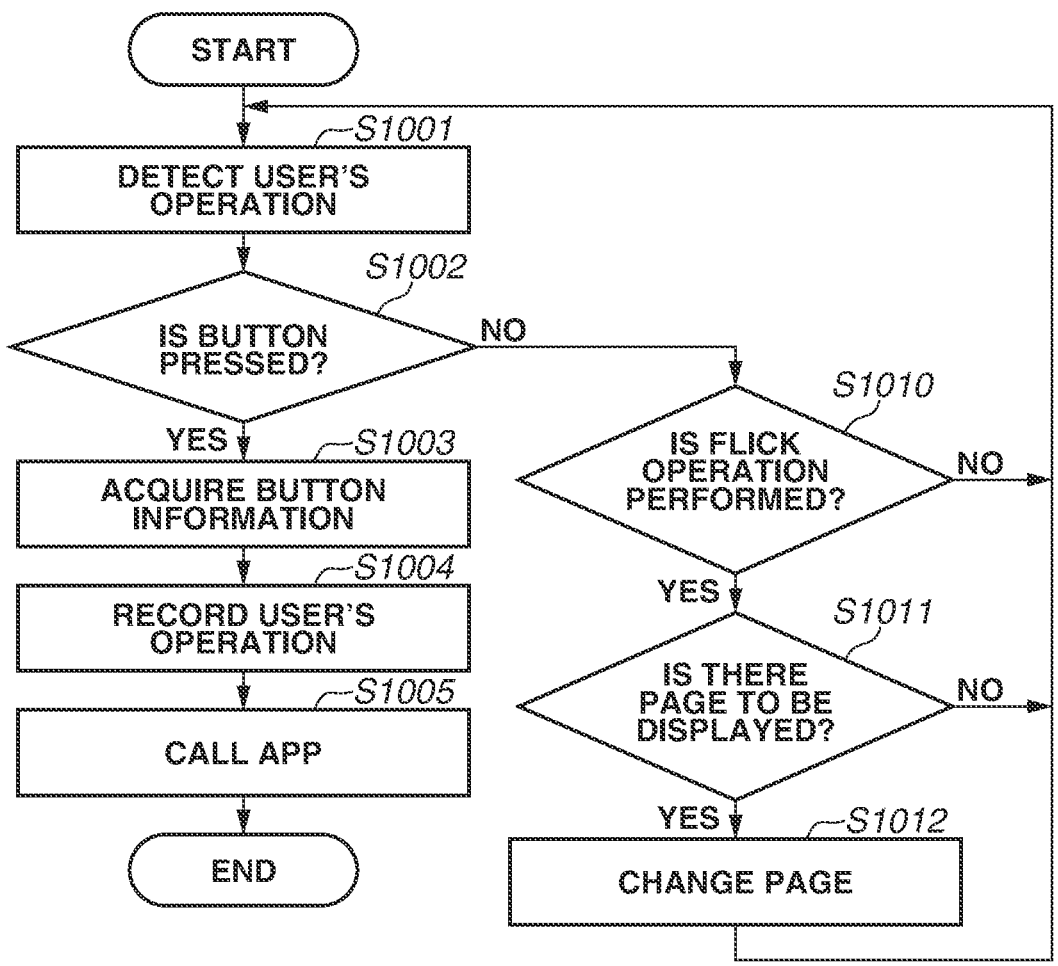
FIG. 10 is a flowchart illustrating operation history recording processing according to the first exemplary embodiment.

FIG. 10 is a flowchart illustrating operation history recording processing according to the present exemplary embodiment. The operation history recording processing illustrated in FIG. 10 is performed by the MFP 101 after displaying the menu screen according to the flowchart of FIG. 9, in order to receive a user's operation on the menu screen and record an operation history in the operation history table 404. Steps illustrated in the flowchart of FIG. 10 are implemented by the CPU 211 loading a program stored in the ROM 212 or the HDD 214 of the MFP 101 into the RAM 213 and analyzing and executing the program.

In step S1001, the menu display unit 405 detects a user's operation on the menu screen. Next, in step S1002, the menu display unit 405 determines whether the user's operation detected in step S1001 is a press of a button. If the menu display unit 405 determines that the user's operation is a press of a button (YES in step S1002), the processing proceeds to step S1003. If not (NO in step S1002), the processing proceeds to step S1010. In the following description, the button pressed by the user in step S1001 will be referred to as the "pressed button".

In step S1003, the menu display unit 405 acquires the button information corresponding to the button ID 501 associated with the pressed button, from the button management table 402.

In step S1004, the operation history management unit 403 records an operation history in the operation history table 404. More specifically, the operation history management unit 403 records system time as the operation date and time 601, records the user ID of the user having performed the operation (i.e., the logged-in user) as the user ID 602, and records the button ID 501 associated with the pressed button as the operated button ID 603.

In step S1005, the menu display unit 405 refers to the button management table 402 and performs processing for calling the app indicated by the calling app 503 corresponding to the pressed button. The called app displays a setting screen for the app on the operation unit 219 and executes a job. Then, the series of processing in FIG. 10 ends.

If, on the other hand, the menu display unit 405 determines in step S1002 that the user's operation is not a press of a button (NO in step S1002), then in step S1010, the menu display unit 405 determines whether the user's operation detected in step S1001 is a flick operation. If the menu display unit 405 determines that the user's operation is a flick operation (YES in step S1010), the processing proceeds to step S1011. If not (No in step S1010), the processing returns to step S1001. In step S1001, the menu display unit 405 waits for a next user's operation.

In step S1011, the menu display unit 405 determines whether there is a page to be displayed in response to the flick operation. More specifically, if the menu display unit 405 detects a flick operation for displaying the previous page while the first page is displayed, the menu display unit 405 determines that there is no page to be displayed. If the menu display unit 405 detects a flick operation for displaying the next page while the last page is displayed, the menu display unit 405 determines that there is no page to be displayed. If the menu display unit 405 determines that there is a page to be displayed in response to the flick operation (YES in step S1011), the processing proceeds to step S1012. If not (NO in step S1011), the processing returns to step S1001. In step S1001, the menu display unit 405 waits for a next user's operation.

In step S1012, the menu display unit 405 changes the displayed page in response to the flick operation. Then, the processing returns to step S1001. In step S1001, the menu display unit 405 waits for a next user's operation.

According to the above-described exemplary embodiment, the information processing apparatus displays the menu screen based on user's operation history information, To display the menu screen, the information processing apparatus determines the number of buttons to be displayed on a single page and the priority display buttons to be displayed on a priority basis, based on user's operation history information. In a case where the determined priority display buttons are not to be displayed on the first page, the information processing apparatus changes the button display order so that the necessary buttons are displayed on the first page. Since the buttons desired by the user are displayed on the first page, the user does not need to switch the pages to select the desired buttons. In addition, since infrequently used buttons are not displayed on the first page, the screen is not complicated. In other words, an appropriate number of buttons frequently used by the user are displayed on the first page of the menu screen. This therefore improves convenience for the user.

In the example of FIG. 9, the MFP 101 determines the number of buttons to be displayed on the menu screen and the buttons to be displayed on a priority basis, based on the use percentage of each button. However, the configuration is not limited thereto. Various forms can be employed as long as the MFP 101 is configured to determine the number of buttons to be displayed on the menu screen and the buttons to be displayed on a priority basis, based on the target, the number of times, the date and time, the method, and the like of an operation performed on the menu screen.

In the example of FIG. 10, the MFP 101 records the operation date and time 601 as an operation history. Alternatively, a configuration may be employed in which the number of times of use of each button is counted for each user. In this case, the MFP 101 can calculate the use percentage by using the counted value of each button of the logged-in user.

A second exemplary embodiment will be described next. The present exemplary embodiment is different from the first exemplary embodiment in the method for calculating the use percentage of each button, the method for determining a priority display button, and the confirmation method in a case where the number of display buttons is changed. In the first exemplary embodiment, when the MFP 101 calculates the use percentage of each button, the MFP 101 simply calculates the percentage of the number of times of use of each button with respect to the total number of times of use of buttons. In the present exemplary embodiment, the MFP 101 performs chronological weighting to calculate the use percentage. In the first exemplary embodiment, when the MFP 101 determines a priority display button, the MFP 101 uses the cumulative value of the use percentages. In the present exemplary embodiment, the MFP 101 uses the use percentage of an individual button. Furthermore, in the present exemplary embodiment, the timing when the MFP 101 displays the confirmation dialog asking the user whether to permit the change in the number of display buttons is after displaying the menu screen after the change. Since the present exemplary embodiment is a variation of the first exemplary embodiment, only the differences from the first exemplar embodiment will be described.

FIG. 11 is a flowchart illustrating menu screen display processing according to the present exemplary embodiment. The flowchart of FIG. 11 is a variation of the flowchart of FIG. 9. In FIG. 11, processing of step S1101 is performed between the processing of step S902 and the processing of step S903 in FIG. 9. In FIG. 11, processing of steps S1110 to S1115 is performed instead of the processing of steps S905 to S911 in FIG. 9. Furthermore, in FIG. 11, processing of steps S1120 to S1125 is performed instead of the processing of steps S912 to S916 in FIG. 9. In FIG. 11, the processing of steps S917 to S919 in FIG. 9 is performed between the processing of step S1115 and the processing of step S1120. The differences from FIG. 9 will be mainly described.

In step S1101, the menu display unit 405 duplicates the user information about the logged-in user acquired in step S902 as a backup in the RAM 213. Hereinafter, the duplicated information will be referred to as the "backup information".

In step S1110, the menu display unit 405 uses the operation histories acquired in step S904 to perform chronological weighting and calculate the use percentage of each button. More specifically, for each operation history, the menu display unit 405 performs multiplication by a weight (a coefficient) based on the operation date and time 601 of the operation history. The weight is set to 1 for the most recent operation history and decreases as time goes back, whereby the more recent operation has a greater influence on the use percentage. Finally, the menu display unit 405 makes an adjustment so that the sum of the use percentages of the buttons is 100%.

The processing of steps S1111 to S1114 is repeated for each button included in the button list. In the following description, a button as a processing target will be referred to as a "target button". In the present exemplary embodiment, the button list is not to be rearranged as in the first exemplary embodiment.

First, in step S1112, the menu display unit 405 determines whether the use percentage of the target button exceeds a threshold (a second threshold). If the menu display unit 405 detentions that the use percentage exceeds the threshold (YES in step S1112), the processing proceeds to step S1113. If not (NO in step S1112), the processing proceeds to step S1114. The threshold may be a fixed value (e.g., 10%), or may be any value that can be set. In step S1113, the menu display unit 405 records the target button as a priority display button in the RAM 213.

In step S1114, the menu display unit 405 determines whether to end the repetitive processing. If the processing is completed for all the buttons in the button list, the menu display unit 405 ends the repetitive processing, and the processing proceeds to step S1115. If the button list includes a button that has not yet been processed, the processing proceeds to step S1111. In step S1111, the menu display unit 405 sets the next button in the button list as the target button and continues the repetitive processing.

In step S1115, the menu display unit 405 determines the number of buttons recorded as the priority display buttons in step S1113, as the number of display buttons. In other words, the MFP 101 holds the number of components of which the use percentages exceed the threshold, as the number of display buttons. The menu display unit 405 then updates the number of display buttons 702 in the user management table 407 through the user management unit 406. In the present exemplary embodiment, the number of display buttons is determined before the user is asked whether to permit the change in the number of display buttons. Thus, the screen after the change can be actually presented to the user.

In step S1120, the menu display unit 405 determines whether the number of display buttons 702 in the user management table 407 is different from the number of display buttons in the backup information. If the menu display unit 405 determines that the numbers of display buttons are different from each other (YES in step S1120), the processing proceeds to step S1121. If not (NO in step S1120), the series of processing in FIG. 11 ends.

In step S1121, the menu display unit 405 displays on the operation unit 219 a confirmation dialog (not illustrated) asking the user whether to use the number of display buttons after the change or return the number of display buttons to the value before the change. Then, in step S1122, the menu display unit 405 receives a selection from the user via the confirmation dialog. In the present exemplary embodiment, since the screen after the change is presented to the user, it is easy for the user to make a decision about whether to permit the change in the number of display buttons.

In step S1123, if the selection received in step S1121 indicates the use of the number of display buttons after the change (YES in step S1123), the series of processing in FIG. 11 ends. If the selection received in step S1121 does not indicate the use of the number of display buttons after the change (NO in step S1123), the processing proceeds to step S1124.

In step S1124, the menu display unit 405 returns the settings of the number of display buttons and the button display order to the values at the time of start of the flowchart in FIG. 11. More specifically, the menu display unit 405 updates the values of the number of display buttons 702 and the button display order 703 in the user management table 407 to the values in the backup information through the user management unit 406. Then, in step S1125, the menu display unit 405 updates the menu screen by using the number of display buttons 702 and the button display order 703 updated in step S1124. In other words, the menu screen returns to the state before the change.

As described above, according to the present exemplary embodiment, an appropriate number of buttons recently frequently used by the user are displayed on the first page of the menu screen. This therefore improves convenience for the user.

In a third exemplary embodiment, a configuration for calculating the use percentage based on the setting values of previously executed jobs in a case where a custom button is newly added will be described. Since an operation history of a newly added custom button is not recorded in the operation history table 404, the newly added custom button cannot be recorded as a priority display button in the above-described processing. However, if a job with the same setting values as those of the newly added custom button has been previously repeated many times, displaying the newly added custom button as a priority display button on the first page of the menu screen can improve convenience for the user. In the first exemplary embodiment, when the MFP 101 determines a priority display button, the MFP 101 uses the cumulative value of the use percentages. In the present exemplary embodiment, the MFP 101 uses the relative use percentage of each button. Furthermore, in the present exemplary embodiment, a lower limit and an upper limit are set for the number of display buttons. In the present exemplary embodiment, processing in a case where the setting of the number of display buttons is selected from predetermined values (e.g., three, six, nine, and twelve) is added. Since the present exemplary embodiment is a variation of the first exemplary embodiment, only the differences from the first exemplary embodiment will be described.

FIG. 12 illustrates an example of the button management table 402 according to the present exemplary embodiment. In the example of FIG. 12, two pieces of button information 1201 and 1202 are added to the eight pieces of button information 511 to 518 held in the button management table 402 in FIG. 5.

Regarding the button defined by the button information 1201, the button ID 501 is "b009", the button name 502 is "color two-sided copy", the calling app 503 is "copy app 410", and the setting values 504 are set.

Regarding the button defined by the button information 1202, the button ID 501 is "b010", the button name 502 is "send to folder C", the calling app 503 is "sending app 412", and the setting values 504 are set. The buttons defined by the pieces of button information 1201 and 1202 are both custom buttons.

FIG. 13 illustrates an example of the operation history table 404 according to the present exemplary embodiment, Since the data table of FIG. 13 is a variation of that of FIG. 6, only the differences from FIG. 6 will be described. In the example of FIG. 13, eight operation histories from an operation history 1311 to an operation history 1318 are recorded. Each operation history includes information such as a calling app 1301 and setting values 1302 in addition to the operation date and time 601, the user ID 602, and the operated button ID 603. As the calling app 1301, an app called by a press of a button is recorded. As the setting values 1302, the setting values of a job executed by the called app are recorded.

Figure 14A:
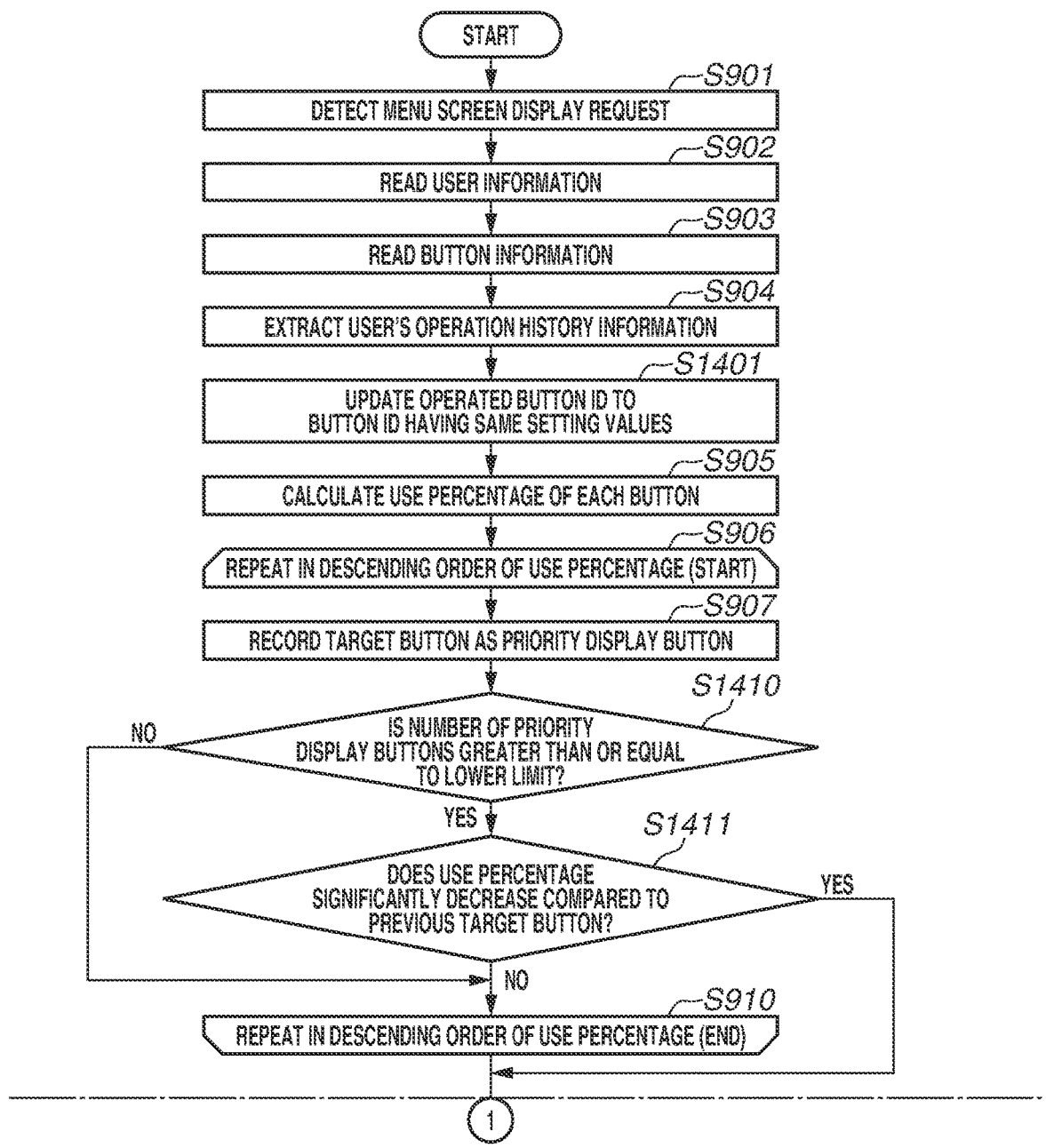
FIGS. 14A and 14B are a flowchart illustrating menu screen display processing according to the third exemplary embodiment.
Figure 14B:
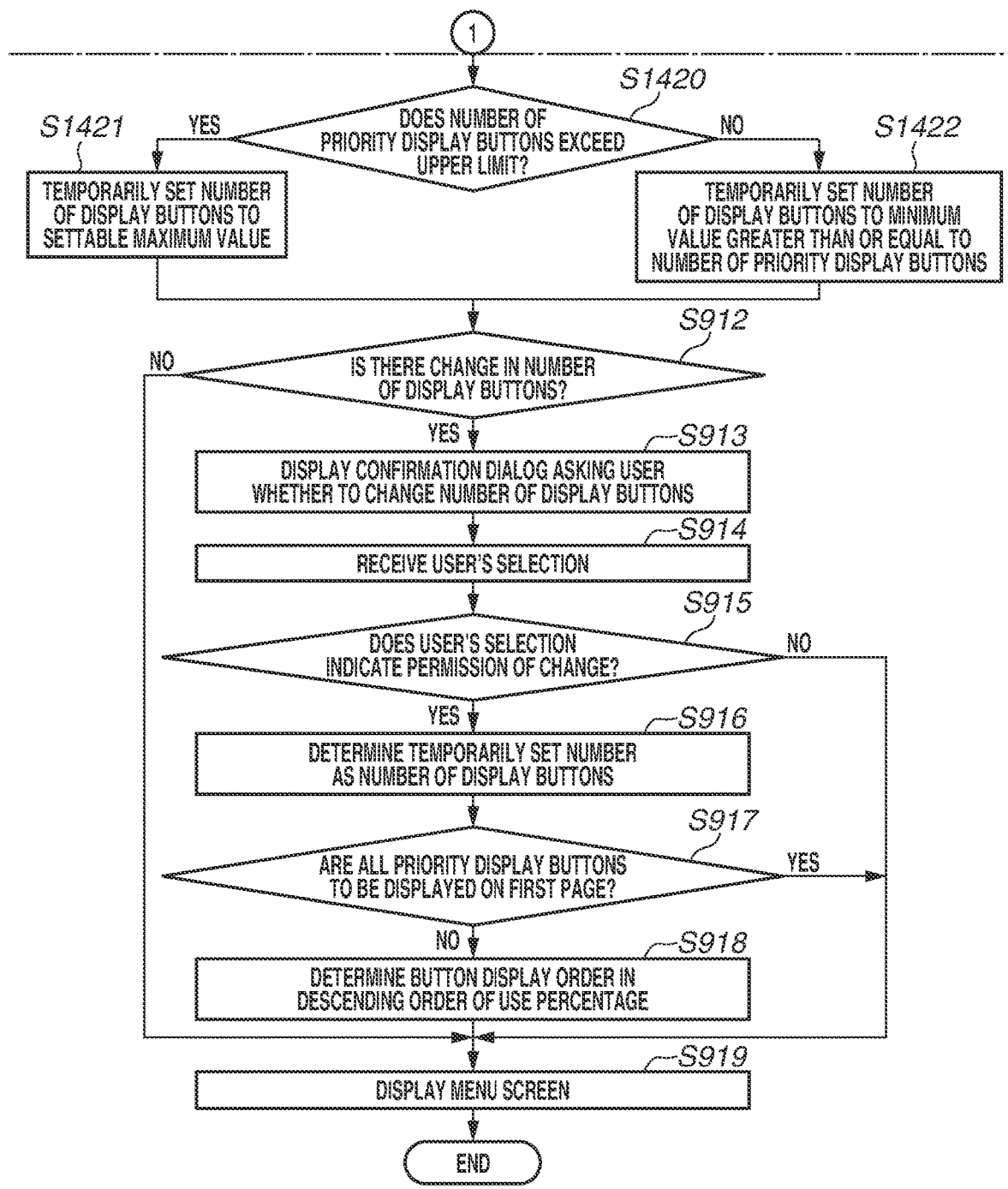

FIGS. 14A and 14B are a flowchart illustrating menu screen display processing according to the present exemplary embodiment. The flowchart of FIGS. 14A and 14B is a variation of that of FIG. 9. In FIG. 14A, processing of step S1401 is performed between the processing of step S904 and the processing of S905 in FIG. 9. In FIG. 14A, processing of steps S1410 and S1411 is performed instead of the processing of steps S908 aid S909 in FIG. 9. Furthermore, in FIG. 14B, processing of steps S1420 to S1422 is performed instead of the processing of step S911 in FIG. 9. The differences from FIG. 9 will be mainly described.

In step S1401, the menu display unit 405 updates the operated button ID 603 in the operation history table 404 to the button ID of a button for which the same calling app and the same setting values are set, through the operation history management unit 403. In this example, the menu display unit 405 compares the calling app 503 and the setting values 504 set in each of the pieces of button information acquired in step S903 and the calling app 1301 and the setting values 1302 recorded in each of the operation histories acquired in step S904, thereby determining whether the calling app 503 and the setting values 504 are the same as the calling app 1301 and the setting values 1302. For example, referring to the button management table 402 of FIG. 12 and the operation history table 404 of FIG. 13, the operated button ID 603 of the operation histories 1313 and 1316 is updated from "b004" to "b009". The operated button ID 603 of the operation histories 1315 and 1318 is updated from "b006" to "b010". More specifically, the MFP 101 compares each operation history and the setting content of each component, and determines whether the calling app 1301 and the setting values 1302 recorded in the operation history are the same as the calling app 503 and the setting values 504 of the component. As a result of the determination, if the calling app 1301 and the setting values 1302 are the same as the calling app 503 and the setting values 504, the MFP 101 treats the operation history used as the comparison target as an operation history indicating that the component used as the comparison target is used. As a result, the operation histories of execution of the same apps as the apps to be called by the newly added custom buttons (defined by the pieces of button information 1201 and 1202) with the same setting values can be retrospectively determined as operation histories of the newly added custom buttons. As described above, the newly added custom buttons can also be priority display targets.

In step S1410, the menu display unit 405 determines whether the number of priority display buttons is greater than or equal to a lower limit. The lower limit may be a fixed value (e.g., three), or may be any value that can be set. If the menu display unit 405 determines that the number of priority display buttons is greater than or equal to the lower limit (YES in step S1410), the processing proceeds to step S1411. If not (NO in step S1410), the processing proceeds to step S910. In other words, the MFP 101 makes an adjustment so that the number of display buttons does not fall below the lower limit determined in advance.

In step S1411, the menu display unit 405 determines whether the use percentage of the target button significantly decreases compared to the use percentage of the target button in the previous processing. A criterion for determining that the use percentage of the target button significantly decreases may be a fixed value (e.g., a decrease by half or more), or may be any value that can be set. If the menu display unit 405 determines that the use percentage significantly decreases (YES in step S1411), the menu display unit 405 ends the repetitive processing, and the processing proceeds to step S1420. If not (NO in step S1411), the processing proceeds to step S910. More specifically, in step S1411, starting from the first of the buttons arranged in descending order of the use percentages, the MFP 101 sequentially sets two adjacent buttons as targets. Then, in a case where the use percentage of the later button of the two target buttons decreases by a threshold (a third threshold) or more compared to the use percentage of the earlier button of the two target buttons, the MFP 101 sets, as the priority display buttons, the buttons from the first button to the earlier button of the two target buttons. This makes it possible to determine the priority display buttons based on the relative use percentages of the plurality of buttons.

In step S1420, the menu display unit 405 determines whether the number of priority display buttons exceeds an upper limit. The upper limit may be a fixed value (e.g., twelve), or may be any value that can be set. If the menu display unit 405 determines that the number of priority display buttons exceeds the upper limit (YES in step S1420), the processing proceeds to step S1421. If not (NO in step S1420), the processing proceeds to step S1422. In other words, the MFP 101 makes an adjustment so that the number of display buttons does not exceed the upper limit determined in advance.

In step S1421, the menu display unit 405 temporarily sets the number of display buttons to the maximum value that can be set. Then, the processing proceeds to step S912.

In step S1422, the menu display unit 405 temporarily sets the number of display buttons to a value that is greater than or equal to the number of priority display buttons and is smallest among the values that can be selected as the number of display buttons. For example, in a case where the values that can be selected as the number of display buttons are three, six, nine, and twelve, and the number of priority display buttons is four, a value that is greater than or equal to four and is smallest among the selectable values, i.e., six, is temporarily set as the number of display buttons. As described above, in the configuration where a value that can be set as the number of display buttons is selected from a group of numerical values determined in advance, the number of priority display buttons cannot be directly set as the number of display buttons. In this case, the MFP 101 selects, as the number of display buttons, a value that is greater than or equal to the number of priority display buttons and is smallest among the group of numerical values determined in advance. Then, the processing proceeds to step S912.

Figure 15:
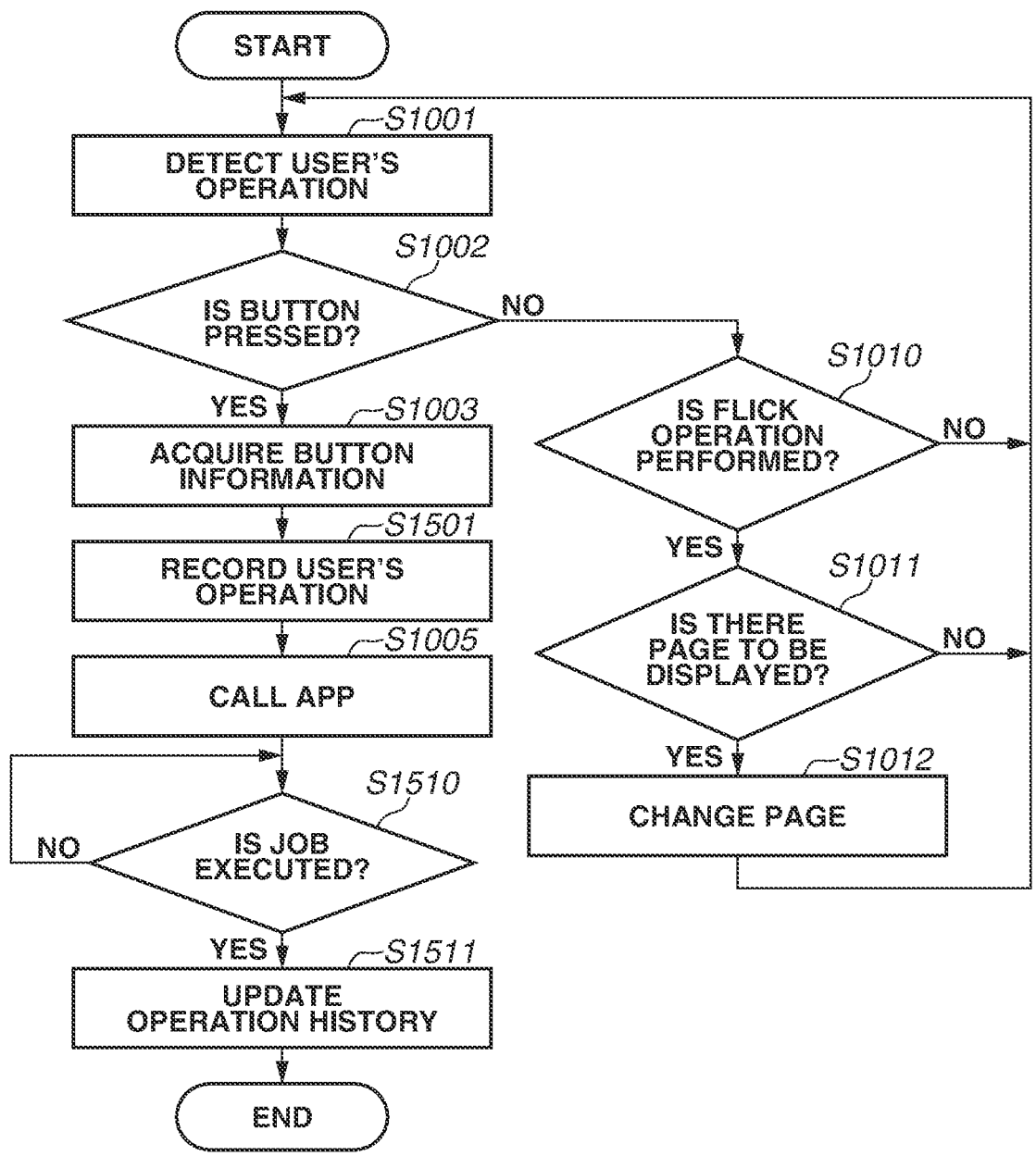
FIG. 15 is a flowchart illustrating operation history recording processing according to the third exemplary embodiment.

FIG. 15 is a flowchart illustrating operation history recording processing according to the present exemplary embodiment. The operation history recording processing illustrated in FIG. 15 is performed by the MFP 101 after displaying the menu screen according to the flowchart of FIGS. 14A and 14B, in order to receive a user's operation about an app on the menu screen and record an operation history in the operation history table 404. The flowchart of FIG. 15 is a variation of that of FIG. 10. In FIG. 15, processing of step S1501 is performed instead of the processing of step S1004 in FIG. 10. In FIG. 15, processing of steps S1510 and S1511 is performed after the processing of step S1005 in FIG. 10. The differences from FIG. 10 will be mainly described.

In step S1501, the operation history management unit 403 records an operation history in the operation history table 404. More specifically, the operation history management unit 403 records system time as the operation date and time 601, records the user ID of the user having performed the operation (i.e., the logged-in user) as the user ID 602, and records the button ID 501 associated with the pressed button as the operated button ID 603. The operation history management unit 403 also records the calling app corresponding to the pressed button as the calling app 1301. In this step, nothing is recorded as the setting values 1302.

In step S1510, the operation history management unit 403 waits for the app called in step S1005 to execute a job. If the operation history management unit 403 detects that the app executes a job (YES in step S1510), the processing proceeds to step S1511. In step S1511, the operation history management unit 403 updates the operation history in the operation history table 404 recorded in step S1501. More specifically, the operation history management unit 403 records the setting values of the executed job as the setting values 1302.

According to the above-described exemplary embodiment, an appropriate number of buttons frequently used by the user can be displayed on the first page of the menu screen. If a job with the same setting values as those of a newly added custom button has been previously repeated many times, the newly added custom button can also be displayed on the first page of the menu screen. This therefore improves convenience for the user.

While the present disclosure includes exemplary embodiments, the above-described exemplary embodiments merely illustrate specific examples, and the technical scope of the present disclosure should not be interpreted in a limited manner based on these exemplary embodiments. The exemplary embodiments of the present disclosure can be carried out in various ways without departing from the technical idea or the main feature of the present disclosure.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-193237, filed Nov. 20, 2020, which is hereby incorporated by reference herein in its entirety.

What is claimed is:

1. An information processing apparatus comprising:
   at least one processor and at least one memory coupled to the at least one processor and storing instructions, which when executed by the at least one processor, cause the at least one processor and the at least one memory to act as:
   a display unit configured to display, on a plurality of pages of an operation screen, a plurality of display objects for giving instructions to perform processing; and
   an acquisition unit configured to acquire use histories of the plurality of display objects,
   wherein a number of display objects to be displayed on a single page of the operation screen among the plurality of display objects is determined based on at least the acquired use histories, and
   wherein respective use percentages of the plurality of display objects are calculated using the acquired use histories, and the number of display objects is determined based on the calculated respective use percentages.

2. The information processing apparatus according to claim 1,
   wherein the acquisition unit further acquires time information about a time when each of the plurality of display objects is used, and
   wherein when the respective use percentages are calculated, weighting is performed using the acquired time information.

3. The information processing apparatus according to claim 1, wherein in a case where a cumulative value obtained by adding the respective use percentages of the plurality of display objects in descending order exceeds a first threshold, a number of display objects, among the plurality of display objects, of which the respective use percentages are added is determined as the number of display objects.

4. The information processing apparatus according to claim 1, wherein a number of display objects, among the plurality of display objects, of which the respective use percentages exceed a second threshold is determined as the number of display objects.

5. The information processing apparatus according to claim 1, wherein when the plurality of display objects is arranged in descending order of the respective use percentages, two display objects arranged adjacent to each other are sequentially set as targets starting from a first display object of the arranged plurality of display objects, and in a case where the use percentage of a later display object of the two display objects set as the targets decreases by a third threshold or more compared to the use percentage of an earlier display object of the two display objects set as the targets, a number of display objects from the first display object to the earlier display object among the arranged plurality of display objects is determined as the number of display objects.

6. The information processing apparatus according to claim 1,
   wherein each of the plurality of display objects is a display object for giving an instruction to perform processing for calling an application, and
   wherein the application to be called and a setting value to be used in the application are settable for each of the plurality of display objects.

7. The information processing apparatus according to claim 6, further comprising a recording unit configured to, based on an operation on the operation screen, record a display object used among the plurality of display objects, the called application, and the setting value used in the application, as the use history of the display object used,
   wherein the use history and a setting content of each of the plurality of display objects are compared to each other, and in a case where the application and the setting value recorded as the use history are same as the application and the setting value in the setting content of the display object subjected to the comparison, the use history subjected to the comparison is treated as a use history indicating that the display object subjected to the comparison is used.

8. The information processing apparatus according to claim 1, wherein the display unit changes the number of display objects based on a set value of the number of display objects.

9. The information processing apparatus according to claim 8, wherein in a case where the determined number of display objects is different from the set value of the number of display objects, a user is asked whether to change the set value of the number of display objects.

10. The information processing apparatus according to claim 1, wherein the use histories are stored for each of users including a first user, and the number of display objects is determined for the first user based on the use histories stored for the first user.

11. The information processing apparatus according to claim 1, wherein in a case where a number of the plurality of display objects to be displayed exceeds the number of display objects, the display unit displays the plurality of display objects on the plurality of pages based on a set display order of the plurality of display objects.

12. The information processing apparatus according to claim 11, wherein a priority display object to be displayed on a priority basis on a first page of the operation screen is determined among the plurality of display objects based on the use histories.

13. The information processing apparatus according to claim 12, wherein the set display order is changed so that the priority display object is displayed on the first page of the operation screen.

14. The information processing apparatus according to claim 1, wherein the number of display objects is adjusted so as not to exceed a predetermined upper limit.

15. The information processing apparatus according to claim 1, wherein the number of display objects is adjusted so as not to fall below a predetermined lower limit.

16. The information processing apparatus according to claim 1, wherein in a case where a group of numerical values selectable as the number of display objects is determined in advance, a value that is greater than or equal to the determined number of display objects and is smallest among the group of numerical values is selected as the number of display objects.

17. The information processing apparatus according to claim 1, wherein the information processing apparatus is an image forming apparatus including an image forming unit configured to form an image.

18. A method for an information processing apparatus, the method comprising:
    displaying, on a plurality of pages of an operation screen, a plurality of display objects for giving instructions to perform processing; and
    acquiring use histories of the plurality of display objects,
    wherein a number of display objects to be displayed on a single page of the operation screen among the plurality of display objects is determined based on at least the acquired use histories, and
    wherein respective use percentages of the plurality of display objects are calculated using the acquired use histories, and the number of display objects is determined based on the calculated respective use percentages.

19. A non-transitory computer-readable storage medium storing a program to cause a computer to perform a method for an information processing apparatus, the method comprising:
    displaying, on a plurality of pages of an operation screen, a plurality of display objects for giving instructions to perform processing; and
    acquiring use histories of the plurality of display objects,
    wherein a number of display objects to be displayed on a single page of the operation screen among the plurality of display objects is determined based on at least the acquired use histories, and
    wherein respective use percentages of the plurality of display objects are calculated using the acquired use histories, and the number of display objects is determined based on the calculated respective use percentages.

* * * * *